United States Patent [19]

Wondra

[11] 4,107,696
[45] Aug. 15, 1978

[54] RECORDER

[75] Inventor: Arthur Wondra, Erlangen, Germany

[73] Assignee: Siemens Aktiengesellschaft, Berlin & Munich, Germany

[21] Appl. No.: 788,314

[22] Filed: Apr. 18, 1977

[30] Foreign Application Priority Data

May 7, 1976 [DE] Fed. Rep. of Germany ....... 2620302

[51] Int. Cl.² .......................................... G01D 15/28
[52] U.S. Cl. ................................................ 346/24
[58] Field of Search ......................... 346/145, 136, 24

[56] References Cited

U.S. PATENT DOCUMENTS

| 2,074,118 | 3/1937 | Ross | 346/145 |
|---|---|---|---|
| 3,731,318 | 5/1973 | Dickey | 346/145 |
| 3,946,406 | 3/1976 | Miura | 346/145 |

Primary Examiner—Joseph W. Hartary
Attorney, Agent, or Firm—Hill, Gross, Simpson, Van Santen, Steadman, Chiara & Simpson

[57] ABSTRACT

A recorder such as a pen line recorder is disclosed having a housing with a hinged front which forms a foldout recording table giving access to the interior, the recording table consists of two rectangular plate members one of which is hinged to the housing adjacent a bottom thereof and the other one of which projects upwardly into the housing securing the front in place. The two rectangular members are received in side guide members and are slidable in the guide members with respect to one another whereby one of the members may be moved first downwardly with respect to the other member to provide clearance at the top of the housing and then both members may be pivoted outwardly.

13 Claims, 8 Drawing Figures

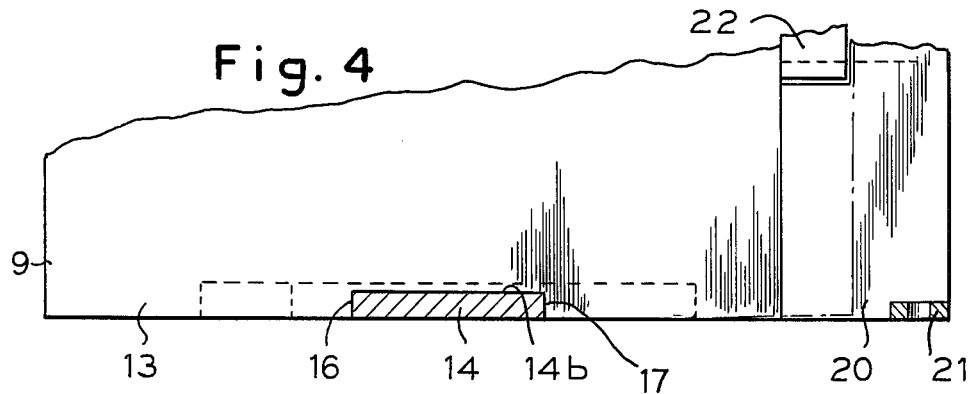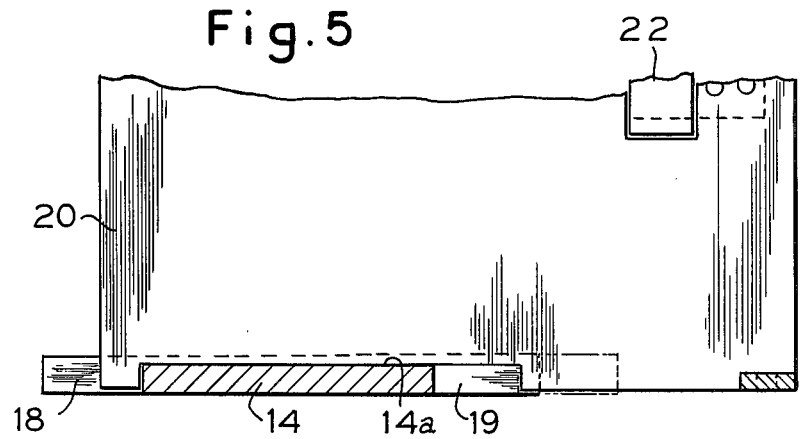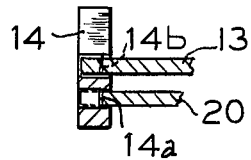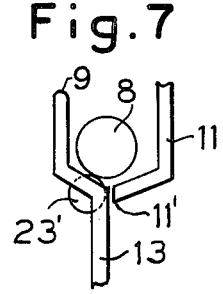

RECORDER

BACKGROUND OF THE INVENTION

1. Field of the Invention

This invention relates to recorder devices and more particularly to a hinged recording table at the front of the recorder providing access to the interior thereof.

2. Prior Art

This invention is directed to recording apparatus of the type used for recording electric analogue signals on a moving belt or strip-like sheet of recording media such as paper. The recorder includes a housing having a meter or other measuring signal responsive device and a meter controlled measurement indicator such as a recording pin. The housing has a foldout recording table in a front area which has a recording or writing edge over which the recording media is moved during operation of the apparatus. Further the housing includes a drive system located adjacent the writing edge controlling movement of the recording media and a tear-off edge positioned adjacent the drive.

In typical prior recorders of the above described type using paper rolls to supply the recording media, it is necessary to position the recording table in such a manner that the writing edge of the recording table is located as close as possible to the writing apparatus or indicator. On the other hand, it is necessary to give easy access to the paper supply roll located interior of the assembly and to the meter or other unit which controls movement of the recording pin or pins. Not only is it necessary to allow access to the area in which the storage paper roll is located, easy access must also be provided to allow threading of the paper around the writing edge and through the drive means. A complicating factor is the fact that in order to keep paper losses low during the threading operation and upon tearing off of the recording media, the drive roller for the recording media and the tear-off edge must be both arranged closely adjacent the writing edge.

These factors necessitated a particular construction and arrangement of the foldout recording table. For example recording machines of the type above described are known wherein the recording table is opened or folded out by means of a drop movement. A drop movement of this type presents a complex movement consisting of both of a linear movement of the table, or portions of it, and a simultaneous superimposed swing or pivoting movement. In such constructions slide members or coulisses are required for the drop movement. The connecting members are normally positioned on the inside of the housing and the arrangement of the coulisses which allow the drop movement causes the construction of such recorders to become complicated and costly. Additionally depending upon whether the recorder is a single or a multi-channel recorder, various different assembly and construction changes must be applied to both the housing and the recording table.

It would therefore be a definite advance in the art to provide a recorder having a recording table which is capable of undergoing a drop and simultaneous pivoting motion which operates in the simplest possible manner for the purpose of inserting a new paper supply roll and threading the paper strip while maintaining the amount of waste paper or other recording medium which is not used for recording as small as possible. It would further be an advance in the art to eliminate the heretofore used coulisses attached to the housing. Additionally, it would be an advance if a simple, uncomplex construction could be provided which is usable both in association with single and multi-channel recorders requiring only a corresponding change in width of the recording table.

SUMMARY OF THE INVENTION

My invention provides an improved recorder of the type above discussed wherein the recording table consists of two rectangular plate members placed one above the other with one of the plates pivotably attached to the housing. The rectangular plate members are held in relation to one another by guide members with the guide members having end recesses receiving side portions of the rectangular members with at least one of the rectangular members slidable in the guides in relation to the other of the rectangular members such that one of the plate members of the recording table is movable longitudinally relative to the housing to shorten the longitudinal length of the recording table allowing clearance of the non-pivoted end of the recording table with respect to the remainder of the housing whereby the recording table may be rotated outwardly.

In specific embodiments of this invention the outermost plate of the table is bent adjacent a drive wheel with the drive wheel acting on the recording media at the bend. Further the outermost recording table plate carries pressure rollers in opposition to the driving roller. In yet another disclosed embodiment, the supply paper roll may be carried on the back side of the recording or writing table.

In the illustrated preferred embodiments disclosed, the writing table with its two plates can be constructed in any given width so as to correspond with the width of the paper used depending upon whether a single channel or a multi-channel recorder is being equipped with the recording table. No additional parts are needed other than plates of different width.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 4 is a fragmentary partially sectional view of the recording table taken along the lines IV—IV of FIG. 1.

FIG. 5 is a view similar to FIG. 4 taken along the lines V—V of FIG. 2a.

FIG. 6 is a fragmentary view taken along the lines VI—VI of FIG. 2a.

FIG. 7 is a fragmentary enlarged view of the writing end of a modification of the recording table of this invention.

DESCRIPTION OF THE PREFERRED EMBODIMENTS

Figure 1:
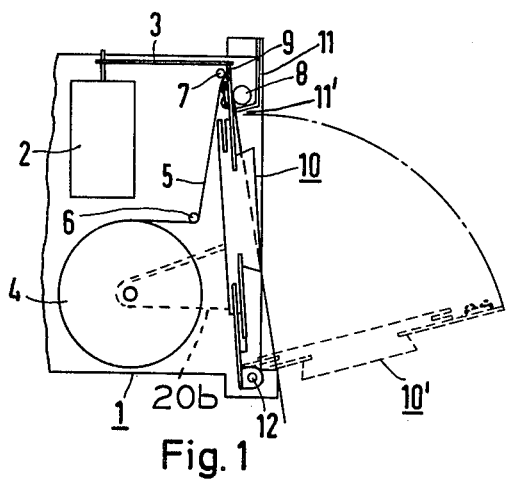
FIG. 1 is a diagrammatic sectional view of a recorder according to this invention illustrating, by broken lines, the opening of the recording table.

FIG. 1 illustrates a recording device according to this invention including a housing 1 having disposed therein a meter or signal responsive device 2 which is equipped with an indicator 3 such as an oscillating pin which is moved in response to a signal input to the meter 2. Both the meter and the indicator 3 are available devices and constitute no part of this invention. Positioned within the housing 1 below the meter 2 is a paper supply roll 4 supplying a strip or band of paper 5 which is directed by means of free rollers 6 and 7 over the writing edge 9 of a recording table 10 where it is acted upon by the indicator 3. A drive cylinder 8 contacts the paper 5 on a front side of the recording table 10 to cause movement of the paper 5.

The writing edge 9 comprises the topmost edge of the recording table 10 which in turn is constructed of various parts as will be hereinafter more fully described. The drive for the paper 5, including the drive cylinder 8 which may be motor driven, is positioned immediately adjacent the writing edge 9 and in a position to engage the front side of the writing table. The drive cylinder 8 may be positioned behind a clear housing face portion such as the cover portion 11 composed of Plexiglas. The cover portion 11 is bent inwardly below the drive roller to a position adjacent the front face of the recording table 10 where it terminates forming a tear-off edge 11'. The tear-off edge 11' allows the recorder paper to be separated closely adjacent the writing edge 9 thereby reducing the consumption of the paper or other recording material which is not intentionally recorded upon.

The recording table 10 is pivotably mounted to the housing about an axis of rotation 12 which, in the embodiment illustrated, is disposed at the bottom of the recording table.

As shown in FIG. 1, the recording table may assume an operating position illustrated by the solid lines designated 10 where the recording table closes the front of the recorder housing 1. Alternatively the recording table may be moved to a service position 10' opening the front of the housing 1 allowing access to the interior thereof, as illustrated in broken lines. It will be apparent that in order to move the recording table 10 from the operating position 10 to the service position 10' it will be necessary for the table to undergo a linear movement downwardly to allow the writing edge 9 to clear the tear-off edge 11' and to thereafter undergo a pivotable or swinging movement to the open position 10'. Upon closure of the unit by swinging from the service position 10' to the closed position, will thereafter be necessary for the table to undergo a reverse longitudinal movement to bring the recording edge 9 to a position sufficiently close to the indicator 3 so that the indicator may operate upon paper passing around the recording edge 9. Once in the closed position, means must be provided to maintain the proper longitudinal positioning of the writing table elements.

Figure 2A:
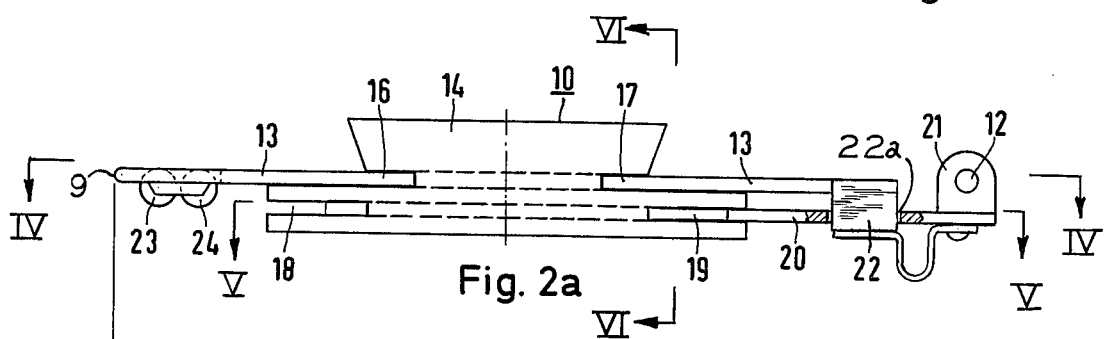
FIGS. 2a and b are side plan views of the recording table of this invention with FIG. 2a illustrating the recording table in full longitudinally extended position and FIG. 2b illustrating the table in shortened position.
Figure 2B:
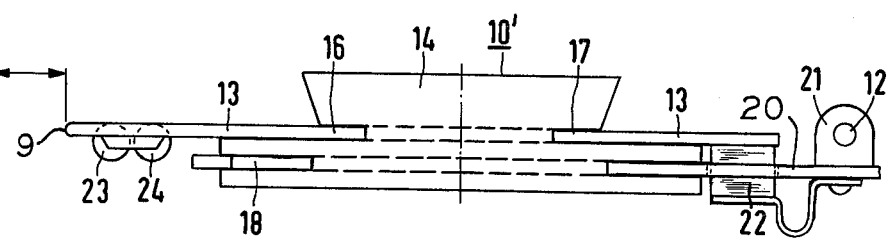

The construction of the recording table is further explained in FIGS. 2a and b and FIGS. 4 through 6. The recording table 10 consists of the actual paper run-off table which includes a substantially rectangular plate 13 having an end forming the writing edge 9. The plate 13 is laterally fixed in two side guides 14 and 15 which may be formed of synthetic material such as plastic or elastic or flexible material. In FIGS. 1, 2a and 2b only the side guide 14 is illustrated. During longitudinal displacement of the recording table 10 in the direction indicated by the double headed arrow in FIGS. 2a and 2b, the side guides 14 and 15 provide guidance and support for the table 13 and for the side edges of the recording media 5. As shown in FIG. 2a the side guide 14 has a shape which is essentially a rectangular base formed with a trapezoid top attached to the base on the shorter base of the trapezoid. From each end of the side guide, notches or recesses 16, 17, 18 and 19 extend inwardly towards the center line of the side guide, illustrated by the dot-dash line of FIGS. 2a and 2b. The recesses 16 through 19 are positioned on two planes as spaced pairs with the recesses 16 and 17 aligned and connected through a connecting groove 14b in the inside face of the side guide 14. The recesses 18 and 19 are aligned and are connected through a groove 14a in the inside face of the side guide.

The side guide 15 is formed as a mirror image of the side guide 14 relative to the plane aligned with the dot-dash line such that the side guides 14 and 15 are identical and a description of the side guides 15 is therefore not necessary.

The rectangular plate 13 of the recording table is snugly fitted in the upper recesses 16 and 17 and the groove 14b as illustrated in FIG. 4. The side edges of the plate 13 being fitted with notches for that purpose.

On the other hand, a second plate 20 forming the back plate of the recording table 10 is provided with a longer notch and is received in the recesses 18 and 19 and the groove 14a with longitudinal clearance such that it is displaceable in the side guides in a longitudinal direction. The bottom end of plate 20, as illustrated in 2b, is equipped with a pivotable connector 21 forming a bearing connection at the pivot point 12 for attachment of the bottom plate 20 to the housing whereby the recording table 10 will be pivotable about the axis of rotation 12. Because of the interconnection of the plates 13 and 20 through the side guides 14 and 15, the plates will move in unison when pivoted around the pivot point 12. However the plates 13 and 20 are longitudinally movable relative to one another and, as such, the entire table 10 is capable of a linear displacement within itself allowing its length to be shortened from the dimension illustrated in 2a to the dimension illustrated in 2b.

In an alternative embodiment, of course the plate 13 can be displaceable with respect to the side guide and the plate 20 can be fixedly attached.

In order to maintain the table in the full extended position, an opening 22a is provided through plate 20 and receives a catch member 22 which may be spring backed as at 22b to be urged into position forming an abutment with the bottom end of plate 13, the catch 22 being in fixed longitudinal position on the plate 20.

Thus, when the recording table is in the closed position illustrated in FIG. 10, the writing edge 9 will be held adjacent the indicator 3. Upon depressing the catch 22, plate 13, forming the paper run off table, can be pushed downwardly over the catch 22 with respect to the plate 20 thereby allowing shortening of the writing table.

In a further development of the writing table, counter pressure rollers 23 and 24 are attached to the back side of the writing plate 13. These rollers, which may be constructed of a synthetic material or a similar flexible material to the material of drive roll 8 are positioned to be opposed to the drive roller 8. The counter rollers 23 and 24 act to cause the recording paper 5 to be synchronously moved around the recording edge 9 when the table 10 is in the operating position.

Figure 3:
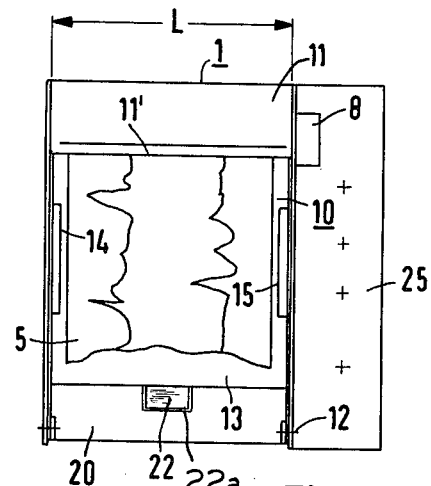
FIG. 3 is a front plan view of the recorder of FIG. 1 with the recording table closed.

FIG. 3 illustrates the exterior of the front of the recorder housing 1. The table 10 is illustrated closed with the exterior portions of the guide rails 14 and 15 shown disposed on either side of the plate 13. The catch 22 is positioned intermediate the sides in an opening 22a through plate 20 with the catch 22 located below the plate 13. Generally the catch 22 will be covered by the paper 5 during operation as the paper is dispensed past the drive roll 8. A control panel 25 is arranged on one side of the housing 1 and the control panel 5 supports the drive roll 8 which is covered by the Plexiglas cover 11 provided with the tear-off edge 11'. By use of a Plexiglas or other clear covering 11 actual recording on the paper 5 can be followed by the observer. FIG. 3, of course, illustrates the recorder in an operating position. If it is desired to open the housing 1 for servicing or other reasons the catch 22 is depressed and the paper run-off table plate 13 is pushed down over the catch to an end position in which the writing edge 9 clears the covering 11 and in particular the tear-off edge 11'. In this position the recording table 10 can be pivoted out approximately 90°.

In a further modification of the invention the table 10 with the plate 13 forming the paper run-off table may be provided with a bent end construction as illustrated in FIG. 7 forming an angulation adjacent the writing edge 9. Thus the drive cylinder 8 is arranged at the angle formed by the bend.

In a further embodiment, illustrated partially in FIG. 1, the paper supply roll 4 may be supported by attachments to the writing table as at 20b. In other embodiments the paper roll 4 may be attached interiorly of the housing with the paper roll axis attached to side walls of the housing. In the modification where the paper roll is carried by the writing table, it is attached on the side of plate 20 which is internal of the housing or which faces into the housing. In this manner the supply roll is capable of being pivoted out of the housing with the recording table 10. When the recording media is then to be replaced the supply roll 4 can then be set onto the corresponding support mandrel or arbor in the holders 20b when the table is open to the position illustrated at 10'. The paper leading edge is then drawn over the recording edge 9 and the recording table is folded shut. In this embodiment it is not necessary to thereafter thread the paper as it is when the paper roll is supported in the housing.

The recorder of this invention is thus distinguished by its simplicity of opening and closing operations which eliminate the requirement of any complex link connections or movements of the recording table. Thus the recording table and therefore the recorder, has a greatly reduced susceptibility to mechanical defects. In addition, because of the simple design herein described, the construction of the housing 1, the control panel 5, the arrangement of the paper supply roll 4, deflection sheaves 6 and 7 and drive cylinder are all independent of the width of the recording carrier 5. The symmetrically constructed and therefore identical guide rails 14 and 15 are standard parts which can properly index with chosen width plates 13 and 20 to provide run-off tables of any desired width. Therefore, in the case of a modular construction of the type disclosed, the construction of single or multi-channel recorders merely requires that the width L of the housing as well as the plates 13 and 20 be correspondingly varied.

Although the teachings of my invention have herein been discussed with reference to specific theories and embodiments, it is to be understood that these are by way of illustration only and that others may wish to utilize my invention in different designs or applications.

I claim as my invention:

1. A recorder for recording electronic analogue signals on a moving strip of recording media comprising: a housing having a signal responsive meter device disposed therein actuating an indicator, a foldout recording table having a writing edge over which recording media is moved during operation of the apparatus, the indicator acting upon the media at the edge, a drive disposed in said housing having a drive roll positioned closely adjacent the writing edge of the writing table when the writing table is in a closed position, a tear-off edge positioned adjacent said drive, the recording table formed of two stacked rectangular plates, one of said plates pivotably attached to the housing, the plates interconnected by side guide members, the side guide members having longitudinal end recesses into which side margins of the plates project, at least one of the plates being longitudinally movable with respect to the side guides whereby the plates are longitudinally movable with respect to one another, the recording table having a closed position with an end of the table remote from the pivot connection projecting longitudinally into the recorder housing whereby the plates may be longitudinally moved to withdraw the end from the housing.

2. The recorder of claim 1 wherein, in the closed position, the recording table has inner and outer plates and the inner plate is pivotably attached to the housing.

3. A recorder according to claim 2 wherein, the recording table, in a closed position has inner and outer plates with the outer plate non-movably indexed with the side guides and the outer plate together with the side guides being longitudinally displaceable relative to the inner plate, the inner plate being pivotably attached to the housing.

4. A recorder according to claim 1 wherein, a spring backed displaceable abutment member carried by one of the plates abuts an edge of another of the plates to maintain the plates in longitudinally extended position.

5. A recorder according to claim 2 wherein, the outer plate has an end forming the writing edge with end portions of said outer plate adjacent the writing edge being bent at an angle with respect to the remaining portions of the outer plate.

6. A recorder according to claim 4 wherein, the outer plate has recording media engaging pressure rollers attached thereto adjacent a writing end thereof.

7. A recorder according to claim 1 wherein, a recording media storage roll is attached to the recording table on an inner face thereof.

8. A recorder according to claim 1 wherein the side guides have a mirror symmetrical construction relative to a center plane perpendicular to their longitudinal extent, the side guides being composed of an elastic material.

9. A recorder according to claim 1 wherein, the tear-off edge is formed as the end of an inwardly bent housing facing member which is constructed of transparent material.

10. The recorder of claim 9 wherein, the writing edge is disposed behind the transparent material in the operating position.

11. In a recording device for recording signals in a line graph display on recording media dispensed past a recording indicator, the improvement of a recording table forming at least a part of a wall of the housing, the recording table being pivotably attached to the housing adjacent one end of the table and being pivotable to a housing open position from a closed operating position, the recording table in the closed operating position having an end opposite the pivotable attachment projecting into the housing with portions of the housing overlapping the recording table in the direction of opening pivoting movement for the recording table, the recording table constructed of first and second substantially rectangular plates, the plates positioned in spaced relation one atop the other, side guides carried by the said plates at side margins of the plates, the side guides having recessed portions receiving marginal portions of the sides of the plates, at least one of said plates attached to the side guides in non-longitudinally movable relationship therewith, another of said plates attached to the side guides with longitudinal clearance relationship between the side margins and the recesses whereby the said another of said plates is longitudinally movable with respect to the side guides whereby the plates are longitudinally movable with respect to one another.

12. The recorder of claim 11 wherein, the plates are equipped with side edge notches intermediate the ends of the plates, the notches defining side portions which project beyond the notch portions, the projecting side portions received in the recesses, the recesses spaced from one another by body portions of the side guides which project into the notches.

13. The recorder of claim 12, wherein longitudinal movement of the plates relative to one another is limited by engagement of the projecting portions of the side margins with the body portions of the side guides.

* * * * *